Patented Oct. 17, 1944

2,360,381

UNITED STATES PATENT OFFICE 2,360,381

PRODUCTION AND TREATMENT OF ZEIN

James F. Walsh, Yonkers, N. Y., Siegfried M. Kinzinger, Hammond, Ind., and Willard L. Morgan, Edgewood, R. I., assignors, by mesne assignments, to Prolamine Products Incorporated, Dover, Del., a corporation of Delaware No Drawing. Application October 31, 1940, Serial No. 363,698

12 Claims. (Cl. 260—123)

The present invention relates to the recovery of alcohol soluble protein from corn gluten.

Zein is an alcohol soluble protein from corn in the classification "prolamin." This defines proteins which are insoluble in water, insoluble in absolute methyl, ethyl or propyl alcohols, but soluble in aqueous alcohol mixtures. Heretofore aqueous alcohol mixtures of from 80% by volume or higher content of the monohydric alcohols, usually ethyl, have been used to extract zein from corn gluten. These extractants also extract some oil and some form of protein which readily forms undesired flocs in zein solutions. Such impurities are capable of being removed by special treatments. The removal of oil involves use of other solvents, such as hydrocarbons, which are solvents for oil, but not for zein. Such special treatments are difficult and expensive and desirably to be avoided.

The object of the present invention is to secure a high grade zein from corn gluten with use of an organic solvent material and water, in a simple procedure which minimizes the extraction of oil, coloring matter, and the said flocculent protein.

The flocculent protein has a bad effect in zein solutions, and it is therefore important that its extraction be minimized. Zein solutions may thicken and gel on storage. It has been determined that the presence of this flocculent protein accelerates the gelling. The present invention not only minimizes the extraction of it, but permits easy removal of that which is extracted, by a simple filtration step. Thus, solutions of zein produced under the conditions of the present invention show less tendency to gel and may be stored for a longer period of time. For example, a solution of such zein extracted by 40% to 65% by volume aqueous ethyl alcohol has several times the storage life of a like solution of zein extracted by means of a higher strength alcohol. The storage life of high strength alcohol solutions of the improved zein is prolonged.

It has been ascertained that as the aqueous component of the alcoholic zein extractant is increased, the solubility of the oil and of the flocculent protein is decreased. Another of the important features of the process is a treatment of the recovered zein in process to increase its solubility in various solvents for ultimate uses of the zein.

In carrying out the process either wet or dry gluten may be used. The gluten, alcohol and water are adjusted in proportion to provide a slurry having up to about 25% solids, and an extractant which is an aqueous alcohol of 40% to 65% alcohol by volume. The proportions of gluten, water, and absolute alcohol are adjusted so that the extract obtained will have a content of zein in the range desired for practical convenience. The solvent action is allowed to exert itself selectively to dissolve zein from the gluten, leaving substantially all the oil and the said flocculent protein undissolved. The temperature may be from 75° F. to 140° F. during this action, but the preferred range is 75° to 85° F., which preferred range applies to the preferred use of 55% to 65% aqueous alcohol. A time period of ½ hour usually suffices, but this will depend upon the particle size of the gluten, and the temperature as well as other factors.

For practical convenience in operation the extract may contain from 3% to 8% of zein, and preferably 6% to 7%, but higher than 8% is possible without departing from the invention. It is suitably separated from insolubles and is then desirably treated to increase the solubility characteristics of the zein. The solubility may be increased to a solubility over that of zein extracted with aqueous alcohols of 80% strength or higher, by oxidizing the extract with a halogen type of agent, such as chlorine and bromine, or their hypohalites of alkali metals or alkali earth metals. The small amount of coloring matter present is incidentally bleached, and the zein is made more soluble. 1% to 2% of a hypochlorite salt based on the weight of dissolved zein is a suitable amount, and the treatment may be carried out under acid, neutral or alkaline conditions.

The extract with or without oxidation, is then chilled and a phase separation occurs at a temperature dependent upon solvent composition and zein character and content. A heavy layer containing alcohol, water and from 20% to 35% zein is formed, with a supernatent layer of alcohol, water and from 0.2% to 0.8% zein. The heavy phase is separated and dried on a hot roll or in a spray system. The dry zein may be mixed with a dry bleaching agent, such as 1% of organic peroxides, like benzoyl or acetyl or urea peroxide, with the result that further decrease in color occurs where this is desired. However, these oxidizing agents and hydrogen peroxide are not suitable for the solubility-altering oxidation effected by halogen as above described.

In practice many refinements and details are considered for efficiency. These are explained in the following discussion.

*Gluten.*—Wet or dry gluten may be used. Where wet gluten is used the water content thereof is introduced into the system requiring a compensating concentration of alcohol in a recovery system. However, it is advantageous to use a wet press cake of gluten as it is available in a starch mill, rather than the same after its ordinary drying. The ordinary drying of gluten not only may denature some of the zein content, but also produces color which is extractable with the zein, and makes large particle size, which prolongs the extracting process.

Dry gluten is preferred when it is specially dried to limit denaturing, to retain particle size, and to lessen color formation. This may be attained by an aero-drying system in which the wet press-cake (about 50% water) is circulated in particle form in a stream of drying air. The drying of each particle occurs more quickly in such a system than when a mass of gluten is dried in the normal way. Thus the denaturing and color formation are greatly lessened.

*Extraction.*—The fine particle size permits quick penetration by the zein-extracting solvent, and a shorter time period for the extraction. Where the temperature of extraction is in the upper part of the range described, the shorter periods of extraction assures less tendency to denature zein. Likewise wet slurries permit rapid extraction at the lower temperatures, thus avoiding denaturizing and losses. There is a greater tendency for this to occur in the present process than where higher strength alcoholic solvents are employed in the prior art. For this reason the preferred temperature for extraction is from 75° F. to 85° F., and this is more important when the solvent is low in alcohol.

Because the concentration of alcohol is low, part of it may be taken directly from the lighter phase after chilling. The small concentration of zein in this phase is thus recycled to avoid the need of recovery of it from said phase, and to avoid recovery of the alcohol from said phase, all for economic reasons.

*Separation.*—Where the extraction is carried out in a continuous system or by use of a sufficient number of batches, the separation may be made by use of a continuous filter system. This discharges gluten residue and extract. The gluten residue is dried in a vapor-saving system which condenses the water and alcohol to a concentration suitable for reuse with dry gluten, or with wet gluten if reinforced with stronger alcohol.

*Oxidation.*—The oxidation is preferably carried out with chlorine because it does not introduce inorganic salts, as does the use of hypochlorites. The extract from the gluten may stand for a while to aid insoluble material to agglomerate, with or without cooling, so that it is easily clarified as by filtering or drawing off the supernatent clear portion. Into this chlorine is bubbled over a period of time which may vary from a short to a long time. From 30 to 60 minutes is satisfactory. The amount of chlorine may vary up to 2 parts by weight for 100 parts of zein dissolved. Above this quantity no appreciable change in solubility occurs. Below this quantity the solubility change varies in the same direction as the absorbed chlorine varies. If alkali is present the chlorine may be introduced faster to form hypochlorite, which will continue the desired oxidation.

*Phase separation*

It is known that aqueous alcoholic solutions of zein may be cooled to a temperature known as the "critical peptization temperature" or "turbidity temperature" (see D. B. Brill, in Jr. Biological Chemistry, vol. LXXII, No. 1, page 244, March 1927). Two liquid phases form, of which the lower has a high concentration of zein, and the upper a low concentration of zein, the solvent of each phase being substantially the same. The heavy phase increases in volume as the temperature resides below the critical temperature. The critical temperature varies according to the aquosity of the aqueous alcohol where the concentration of zein is above about 3%. For such zein solutions of varying aquosity, definite curves for the critical temperature exist, which are loop-form, having a minimum temperature for a definitely aqueous solvent mixture. Different curves characterize the different alcohols. A critical temperature may be attained by cooling a given solution, or by changing the aquosity of the solvent to approach the curve. In some cases this may be done by increasing the aquosity. For example, where 40% to 65% ethyl alcohol in a water-alcohol solvent, is used, the critical temperature may be attained either by cooling, or by increasing the aquosity, or by both together. Therefore, where it may not be desirable to cool, dilution may be employed to secure two liquid phases. Dilute alcohol or water may be used to increase the aquosity of the solvent. In adding water, it is possible locally to precipitate solid zein by too high a local aquosity, and in such case it is desirable to wait for resolution, or to apply heat to hasten resolution.

The extent of coolness below the critical temperature determines the content of zein in the upper layer. It is not necessary to go to the limit in effecting concentration in the lower layer, because the amount left in the upper phase is always much lower than in the extract before phase separation. Whatever is left in the lighter phase need not be lost because it may be recycled as described. The phase separation may be a batch or continuous process. A continuous centrifuge may be used for the purpose, into which the phase-separated extract may be continuously fed. Ordinarily, cooling to a temperature of between 35° and 55° F. effects phase separation, although higher and lower temperatures may be encountered. The concentration of zein in the solution before phase-separation may vary from as low as 2% to 3% to saturation, without loss of the property of separating on chilling, according to the characteristic curve for the solvent used. The solvent may be methyl, ethyl, the propyl, the butyl and other appropriate alcohols, used singly or in mixtures.

It may be desirable not to employ cooling apparatus, and preferred to dilute the solution to secure phase separation. This is illustrated by the following data, derived by a 60% ethyl alcohol solution by volume, having a zein content from 6% to 7%. The table shows the amount of water in cc. added to 200 cc. of the solution, and the resulting strength in percent alcohol by volume of the diluted solution. For the purpose of the comparison, the diluted solution was heated to 140° F. and allowed to cool to become cloudy at the critical temperature shown. Then it was allowed to cool further, and the temperature was noted where phase separation became very apparent by settling to the bottom. On separation, the amount of zein separated by phase-separation is shown by the last column giving the percent of the zein involved, which remains in the top layer at 70° F.

| Original solution | Water added | Diluted solvent as per cent alcohol by volume | Critical temperature | Zein settled at °F. | Zein in top layer |
|---|---|---|---|---|---|
| Cc. | Cc. | | °F. | | Per cent |
| 200 | 4 | 58.9 | -------- | ------ | 5.0 |
| 200 | 8 | 57.7 | -------- | ------ | 5.0 |
| 200 | 12 | 56.6 | -------- | ------ | 4.3 |
| 200 | 16 | 56.6 | -------- | ------ | 3.3 |
| 200 | 20 | 54.5 | -------- | ------ | 4.3 |
| 200 | 24 | 53.6 | 79 | ------ | 4.1 |
| 200 | 28 | 52.6 | 84 | ------ | 1.7 |
| 200 | 32 | 51.7 | 90 | 82 | 1.4 |
| 200 | 36 | 50.9 | 92 | 88 | 1.2 |
| 200 | 40 | 50.0 | 98 | 89 | 0.9 |
| 200 | 44 | 49.2 | 100 | 92 | 0.7 |
| 200 | 48 | 48.4 | 106 | 100 | 0.6 |
| 200 | 52 | 47.6 | 110 | 100 | 0.5 |
| 200 | 56 | 46.9 | 114 | 105 | 0.5 |
| 200 | 60 | 46.2 | 117 | 108 | 0.4 |
| 200 | 64 | 45.5 | 116 | 111 | 0.4 |
| 200 | 68 | 44.8 | Soon | 112 | 0.4 |
| 200 | 72 | 44.1 | Soon | 116 | 0.3 |
| 200 | 76 | 43.5 | At once | 117 | 0.3 |
| 200 | 80 | 42.9 | At once | 118 | 0.3 |

*Recovering zein.*—The heavy phase, after chilling, as discharged from the separation equipment may be used as a source or supply of zein. However, where recovery of alcohol without dilution is an economic aim of the present process, the said liquid phase may be dried to drive off the liquid as vapor and to recover it as a useful condensate. A roll, vacuum, or spray drier is suitable, in which the temperature of the zein residue should not exceed 135° F. to minimize the zein being in part denatured. The vapors when condensed are directly usable for further extraction. The dried zein may be ground and used directly. If desired, the dry oxidation agent mentioned above may be used to produce further bleaching.

*The product.*—The zein so obtained is light in color, relatively free from oil and from the said protein which flocculates when dissolved in suitable solvents. It has increased solubility in zein solvents of the aqueous organic solvent type, and in alkalis. Compared to zein which has been prepared by extraction with aqueous alcohols, of 80% strength, for example it is soluble in 6% ammonia water, rather than insoluble.

*Example.*—The following illustrates the process: 100 parts by weight of gluten (dry basis) is treated with 300 parts by weight of aqueous ethyl alcohol (40% to 60% ethyl alcohol by volume), for half an hour where the gluten is finely divided, as in aero-drying. The mass is agitated to hasten penetration at 75° F. to 85° F., thus avoiding heating equipment. The liquid is filtered off, using filter-aid, such as diatomaceous earth, if desired. Use of filter-aid may be delayed for a subsequent clarifying filtration of the liquid extract, where the gluten residue has commercial value.

From 1% to 2% of chlorine based on the weight of extracted zein is passed into the solution by slowly bubbling the gas into it over a period of ½ to 1 hour, without need to heat or cool. The resulting bleached zein solution is clarified by filtration and the filtrate then chilled well below the turbidity point until two liquid phases are formed. A lower temperature of from 30° F. to 60° F. may be attained. The two liquid phases are separated. The heavy phase is a zein solution. It may be dried, alcohol is recovered and reused as described.

The proportion of alcohol to water is substantially the same in each layer present after chilling, and will be from 49% to 60% alcohol, some water being acquired in process, especially from the gluten. The two phases differ in zein content.

The oxidation is not essential and may be omitted. However it is desired in order to increase the zein solubility so that more of it is concentrated in the heavy phase, and so that the zein recovered from said phase has the improved solubility characteristics.

The recovered zein, with or without oxidation lacks the oil, coloring matter, and the flocculent protein which usually accompanies the zein when the extraction is made with higher strength alcohols, and is of greater stability when in solution. Recovery of the zein extracted as herein described may be effected otherwise, and in known manners. For example it may be precipitated by adding water to the alcohol solution, and preferably by the process of Buron & McDonough U. S. Patent No. 2,044,769.

The preferred process then is the extraction with highly aqueous alcohol, optional oxidation of the extract, diluting or chilling the extract, separating the heavy phase for recovering zein therefrom, and reusing the lighter phase as a part of the extractant for a subsequent processing.

Herein, the term zein is used in a generic sense to indicate the corn protein extracted from the gluten according to this invention, as well as the modifications of it which may be the result of the described oxidation. Also in the foregoing, the percentage figures applied to aqueous alcohols are considered to be per cent by volume.

We claim:

1. The method of preparing zein which comprises extracting zein from corn gluten with an aqueous monohydric alcohol solvent of from 40% to 65% alcohol by volume at a temperature of from 75° F. to 140° F., subjecting the zein in the extract to the action of an oxidizing agent from the group consisting of chlorine and bromine halogens and their hypohalite salts of alkali metals and alkali earth metals, treating the zein solution to form two liquid phases, separating the said two phases, driving off the liquid solvent of the heavy phase at a temperature for the zein residue of not over 135° F. whereby to provide zein, and extracting more gluten with an extracting alcohol containing in its composition the alcohol of the lighter phase and the zein thereof.

2. The method of preparing zein which comprises extracting zein from corn gluten with an aqueous monohydride alcohol solvent of from 40% to 65% alcohol by volume at a temperature of from 75° F to 140° F., subjecting the zein in the extract to the action of an oxidizing agent from the group consisting of chlorine and bromine halogens and their hypohalite salts of alkali metals and alkali earth metals, treating the zein solution to form two liquid phases, separating the said two phases, recovering zein from the heavy phase, and extracting more gluten with an extracting alcohol containing in its composition the alcohol of the lighter phase and the zein thereof.

3. The method of preparing zein which comprises extracting zein from corn gluten with an aqueous monohydric alcohol solvent of from 40% to 65% alcohol by volume at a temperature of from 75° F. to 140° F., subjecting the zein in the extract to the action of an oxidizing agent from the group consisting of chlorine and bromine halogens and their hypohalite salts of alkali metals and alkali earth metals, treating the zein solution to form two liquid phases, separating the two phases, and recovering zein from the heavy phase.

4. The method of preparing zein which comprises extracting zein from corn gluten with an aqueous monohydride alcohol solvent of from 40% to 65% alcohol by volume at a temperature of from 75° F. to 140° F., subjecting the zein in the extract to the action of an oxidizing agent from the group consisting of chlorine and bromine halogens and their hypohalite salts of alkali metals and alkali earth metals, and recovering zein from the solution.

5. The method of preparing zein which comprises extracting zein from corn gluten with an aqueous monohydric alcohol solvent of from 40% to 65% alcohol by volume at a temperature of from 75° F. to 140° F., and subjecting the zein in the extract to the action of an oxidizing agent from the group consisting of chlorine and bromine halogens and their hypohalite salts of alkali metals and alkali earth metals, whereby the solubility characteristics of the extracted zein are increased.

6. The method of preparing zein which comprises extracting zein from corn gluten with an aqueous monohydric alcohol solvent of from 40% to 65% alcohol by volume at a temperature of from 75° F. to 140° F., treating the zein solution to form two liquid phases, separating the two phases, driving off the liquid solvent of the heavy phase at a temperature for the zein residue of not over 135° F. whereby to provide zein, and extracting more gluten with an extracting alcohol containing in its composition the alcohol of the lighter phase and the zein thereof.

7. The method of preparing zein which comprises extracting zein from corn gluten with an aqueous monohydric alcohol solvent of from 40% to 65% alcohol by volume at a temperature of from 75° F. to 140° F., treating the zein solution to form two liquid phases, separating the two phases, recovering zein from the heavy phase, and extracting more gluten with an extracting alcohol containing in its composition the alcohol of the lighter phase and the zein thereof.

8. The method of preparing zein which comprises extracting zein from corn gluten with an aqueous monohydric alcohol solvent of from 40% to 65% alcohol by volume at a temperature of from 75° F. to 140° F., treating the zein solution to form two liquid phases, separating the two phases, and recovering zein from the heavy phase.

9. The method of preparing zein which comprises extracting zein from corn gluten with an aqueous monohydric alcohol solvent of from 55% to 65% alcohol by volume at a temperature of 75° to 85° F. in proportion to provide an extract having from 3% to 8% zein, treating the extract solution to provide two liquid phases, separating the two phases, and recovering zein from the heavy phase.

10. The method of preparing zein which comprises extracting zein from corn gluten with an aqueous monohydric alcohol solvent of from 55% to 65% alcohol by volume at a temperature of 75° to 85° F. in proportion to provide an extract having from 3% to 8% zein, subjecting the zein to the action of 1 to 2 parts by weight of chlorine to 100 parts by weight of zein, treating the extract solution to provide two liquid phases, separating the two phases, and recovering zein from the heavy phase.

11. The method of preparing zein which comprises extracting zein from corn gluten with an aqueous monohydric alcohol solvent of from 55% to 65% alcohol by volume at a temperature of 75° to 85° F. in proportion to provide an extract having from 3% to 8% zein, treating the extract solution to provide two liquid phases, separating the two phases, and driving off the liquid solvent of the heavy phases at a temperature for the zein residue of not over 135° F. whereby to provide zein.

12. Oxidized zein having solubility in aqueous ammonia as a result of oxidation, said oxidized zein being the product of oxidizing zein dissolved in a solution in an aqueous monohydric alcohol solvent having at least 40% zein-solvent alcohol by volume, by the oxidizing action of oxidizing material selected from the group consisting of chlorine and bromine halogens and their hypohalite salts of alkali metals and alkali earth metals.

JAMES F. WALSH.
SIEGFRIED M. KINZINGER.
WILLARD L. MORGAN.